US012607991B2

(12) United States Patent
Scholles et al.

(10) Patent No.: US 12,607,991 B2
(45) Date of Patent: Apr. 21, 2026

(54) METHOD FOR TRACING FORGED PARTS OVER THE ENTIRE PRODUCTION PROCESS, IN PARTICULAR FROM THE FORGING PROCESS, VIA SANDBLASTING AND HEAT TREATMENT, TO MECHANICAL PROCESSING

(71) Applicant: SMS group GmbH, Düsseldorf (DE)

(72) Inventors: Martin Gerhard Scholles, Mainz (DE); Axel Rossbach, Korschenbroich (DE); Frank Viegen, Mönchengladbach (DE)

(73) Assignee: SMS group GMBH, Düsseldorf (DE)

( * ) Notice: Subject to any disclaimer, the term of this patent is extended or adjusted under 35 U.S.C. 154(b) by 496 days.

(21) Appl. No.: 18/273,747

(22) PCT Filed: Feb. 11, 2022

(86) PCT No.: PCT/EP2022/053309
§ 371 (c)(1),
(2) Date: Jul. 21, 2023

(87) PCT Pub. No.: WO2022/171772
PCT Pub. Date: Aug. 18, 2022

(65) Prior Publication Data
US 2024/0302825 A1 Sep. 12, 2024

(30) Foreign Application Priority Data

Feb. 15, 2021 (DE) .................... 10 2021 201 389.9
Sep. 8, 2021 (DE) .................... 10 2021 209 878.9

(51) Int. Cl.
*G05B 19/418* (2006.01)
(52) U.S. Cl.
CPC .................. *G05B 19/41865* (2013.01); *G05B 2219/31039* (2013.01)

(58) Field of Classification Search
USPC ......................................................... 700/116
See application file for complete search history.

(56) References Cited

U.S. PATENT DOCUMENTS

| | | | | |
|---|---|---|---|---|
| 2005/0247092 A1* | 11/2005 | Kirchhoff | .............. | B21C 51/00 |
| | | | | 72/16.7 |
| 2020/0030865 A1 | 1/2020 | Zeh et al. | | |
| 2021/0308798 A1* | 10/2021 | Fraser | ..................... | B41M 5/24 |

FOREIGN PATENT DOCUMENTS

| | | |
|---|---|---|
| CN | 110782141 A | 2/2020 |
| CN | 110852558 A | 2/2020 |

(Continued)

OTHER PUBLICATIONS

JP_2009037382_A (Year: 2009).*

(Continued)

*Primary Examiner* — Hien D Khuu
(74) *Attorney, Agent, or Firm* — Organization

(57) ABSTRACT

Tracing forged parts over their production process includes: capturing process parameters of a forging process; marking a workpiece with a first identifier; storing the captured process parameters and the first identifier in a database; reading the identifier from the workpiece produced in the previous process step; capturing process parameters during subsequent process steps; storing the process parameters of the subsequent process steps in the database for the read identifier, if legibility of the first identifier of the workpiece remains during the subsequent process step; marking the workpiece produced in the subsequent process step with a further identifier, if legibility of the first identifier of the workpiece does not remain during the subsequent process step of the production process; and storing the process parameters of the subsequent process step together with the (Continued)

further identifier and process parameters of the previous process steps and the first identifier in the database.

17 Claims, 1 Drawing Sheet

(56)                    References Cited

FOREIGN PATENT DOCUMENTS

| CN | 108595612 B | 9/2021 |
|----|-------------|--------|
| EP | 3696630 A1 | 8/2020 |
| JP | H054152 A | 1/1993 |
| JP | 2005063095 A | 3/2005 |
| JP | 2005346460 A | 12/2005 |
| JP | 2007115038 A | 5/2007 |
| JP | 2009262165 A | 11/2009 |
| JP | 2013166163 A | 8/2013 |
| JP | 2020027323 A | 2/2020 |

OTHER PUBLICATIONS

CN_110659913_A (Year: 2020).*
CN_110782141_A (Year: 2020).*
WO_2005015478_A1 (Year: 2005).*
CN111580452A (Year: 2020).*
Liewald, Mathias, et al. "On the tracking of individual workpieces in hot forging plants." CIRP Journal of Manufacturing Science and Technology 22 (2018): 116-120.

* cited by examiner

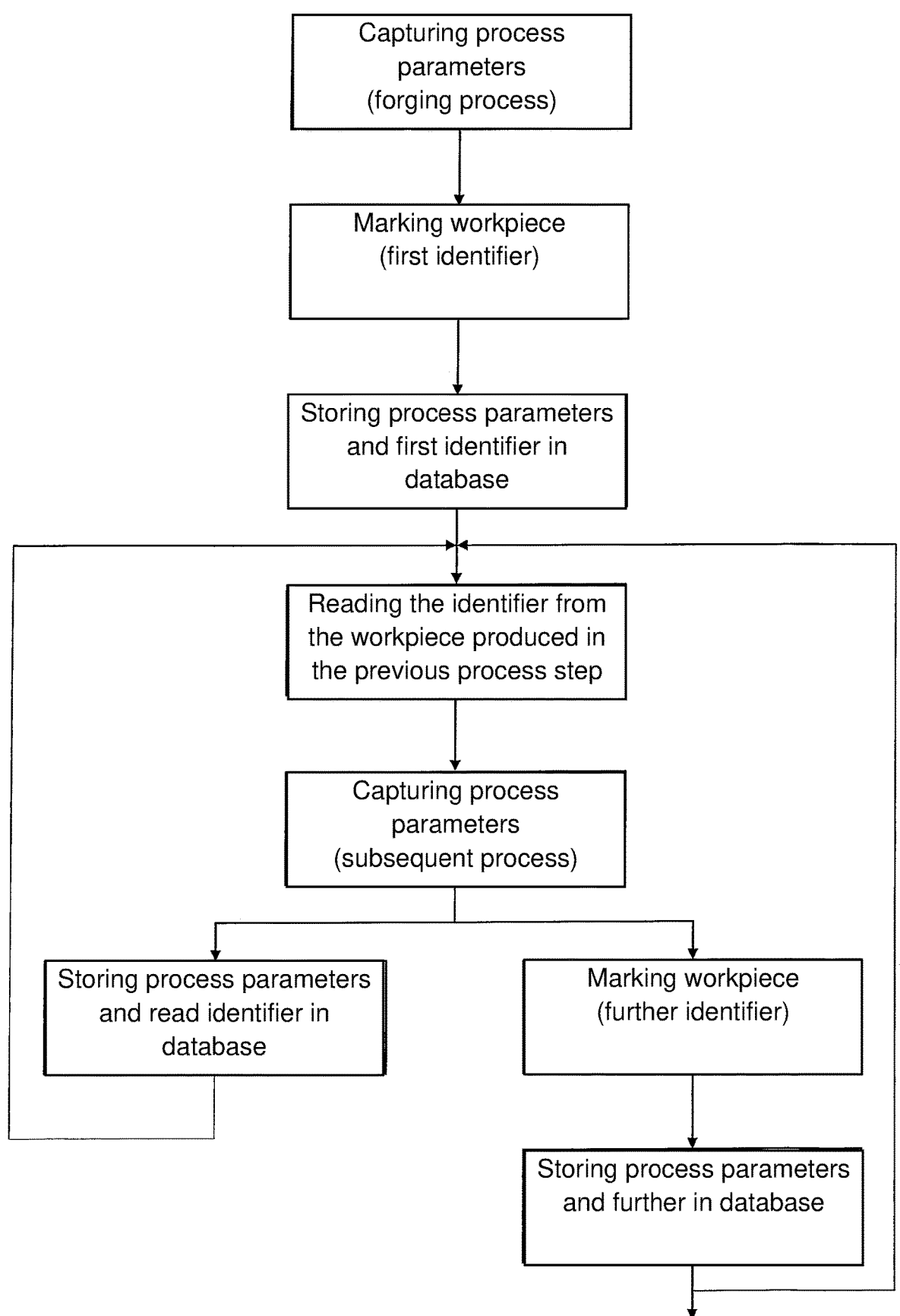

METHOD FOR TRACING FORGED PARTS OVER THE ENTIRE PRODUCTION PROCESS, IN PARTICULAR FROM THE FORGING PROCESS, VIA SANDBLASTING AND HEAT TREATMENT, TO MECHANICAL PROCESSING

CROSS-REFERENCE TO RELATED APPLICATION

This application is a national stage application, filed under 35 U.S.C. § 371, of International Patent Application PCT/EP2022/053309, filed on Feb. 11, 2022, which claims the benefit of German Patent Applications DE 10 2021 201 389.9, filed on Feb. 15, 2021, and DE 10 2021 209 878.9, filed on Sep. 8, 2021.

TECHNICAL FIELD

The disclosure relates to a method for tracing forged parts over the entire production process, in particular from the forging process, via sandblasting and heat treatment, to mechanical processing.

BACKGROUND

Tracing workpieces is beneficial in many respects. For example, if quality problems occur with a workpiece, other workpieces that were produced under comparable conditions may be identified in order to check, sort out or replace them. This is advantageous, for example, in the case of components for the automotive industry, because in the event of problems with a component, not all components from the same production batch have to be replaced, which may involve a costly recall campaign; rather, only those components that were produced under comparable conditions have to be replaced. However, this requires that the components (forged parts) can be traced over the entire production process. Tracing the workpieces also includes access to the process parameters of the individual process steps in the production process.

Traceability of forged parts over the entire production process requires consistent identification of workpieces from the forging process, via sandblasting and heat treatment, to mechanical processing and the final use of the finished forged part. However, the environmental conditions and accompanying circumstances prevailing during the forging process, in conjunction with the requirements placed on the finished forged part, prevent consistent identification of the workpieces from the forging process, via sandblasting and heat treatment, to mechanical processing and the final use of the finished forged part. During and immediately after the forging process, there is an extremely high thermal stress from the hot workpiece and the corresponding thermal radiation. Furthermore, after the forging process, the workpiece has a scaling of the surface, which prevents direct access to the workpiece surface. Impurities from sprays such as graphite are added to this. In the following process steps, the scaling is removed by means of methods for the mechanical and/or thermal removal of material, for example by sandblasting or shot peening, and the surface of the workpiece is processed by a heat treatment such as case hardening, carbonitriding or quenching and tempering, which results in a high mechanical stress. Consistent identification must endure under these conditions, but at the same time the requirements for the final workpiece (forged part) prevent the use of identifications that negatively affect the mechanical properties of the workpiece. This eliminates damage to the workpiece surface (notch effect), deterioration of corrosion resistance or negative influences on the assembly process.

Furthermore, the individual process steps of the entire production process are usually not carried out immediately sequentially one after the other; rather, the workpieces are stored temporarily between individual process steps, for example. Furthermore, in some process steps, a plurality of workpieces are processed in parallel, which is the case, for example, in blast treatment or heat treatment. Thus, the continuous optical tracing of the workpieces over the entire production process is not possible.

SUMMARY

Therefore, the disclosure is based on the object of providing a method for tracing forged parts over their entire production process, including a forging process, sandblasting, heat treatment, and mechanical processing, which meets all the above requirements.

The object is achieved by a method for tracing forged parts over the entire production process, in particular from the forging process, via sandblasting and heat treatment to mechanical processing, comprising the following steps:

Capturing process parameters of the forging process;

Marking the workpiece produced in the forging process with a first identifier by means of a mechanical or thermal penetrant method;

Storing the captured process parameters of the forging process together with the first identifier of the produced workpiece in a database;

Reading the identifier from the workpiece produced in the previous process step;

Capturing process parameters during subsequent process steps of the production process;

Storing the process parameters of the subsequent process steps in the database for the read identifier, if the legibility of the first identifier of the workpiece remains during the subsequent process step of the production process;

Marking the workpiece produced in the subsequent process step with a further identifier by means of a surface inscription method, if the legibility of the first identifier of the workpiece does not remain during the subsequent process step of the production process; and Storing the process parameters of the subsequent process step together with the further identifier together with the process parameters of the previous process steps and the first identifier in the database.

In accordance with the method, the associated process parameters are captured in all process steps of the production method of the forged part. This is done, for example, through process automation of the respective production process. So that the captured process parameters may be assigned to the produced workpiece at any time along the process chain or subsequent use, the workpiece produced by means of the forging process is provided with a first identifier by means of a mechanical or thermal penetrant method. The first identifier and the captured process parameters are stored in a database for later tracing. On the basis of the first identifier, the process parameters of the forging process may be retrieved from the database at a later point in time.

The step of capturing process parameters of the forging process can comprise the capture of parameters before, during and after the forging process. For example, raw material data is captured before the forging process, parameters of the forging process are captured during the forging process, such as forces, temperatures, etc., and parameters of the generated workpiece may be captured after the forging process, such as dimensions.

The advantage of the mechanical or thermal penetrant method for generating the first identifier is that it automatically removes the brittle scale layer in the region of the first identifier, since it flakes off. Moreover, any impurities do not have a negative effect on the first identification, since this is generated by mechanical penetration into the surface of the workpiece. Since the workpiece still has a very high temperature of up to 1250° C. after the forging process, the mechanical means of generating the first identifier may penetrate the workpiece surface more easily. Moreover, the mechanical means for generating the first identifier may be formed by simple mechanical devices that can withstand the thermal and mechanical stresses after the forging process. As an alternative to the mechanical penetrant method, a thermal penetrant method can be used to generate the first identifier. The thermal penetrant method, for example, relies on a laser to generate the first identification.

The first identifier produced by the mechanical or thermal penetrant method remains in the subsequent process steps of blast treatment and heat treatment, such that the process parameters captured in such process steps are stored in the database together with the process parameters of the forging process for the first identifier.

During subsequent mechanical processing of the workpiece, such as turning, milling, grinding or the like, the first identifier is removed and can no longer be read for tracing the processed workpiece. Therefore, the workpiece processed in such process step is subsequently provided with a further identifier, wherein the further identifier is generated by means of a surface inscription method. The process parameters captured during the associated process step are assigned to the first identifier of the corresponding workpiece in the database together with the further identifier. Thus, the further identifier can be used to retrieve the corresponding first identifier from the database and the workpiece can be traced back through the entire production process, and all process parameters of all process steps stored accordingly in the database can also be accessed.

Theoretically, it is also possible that during further processing of the workpiece, a new identifier is applied by means of a surface inscription method, if the previous further identifier does not remain during such further processing.

According to a preferred variant of the invention, the first identifier is generated in a region of the workpiece produced in the forging process, which is removed in one of the subsequent process steps. The region with the first identifier is removed mechanically, for example, by subsequent processing. Due to the subsequent removal of the first identifier, such first identifier generated by means of the mechanical or thermal penetrant method has no negative influence on the workpiece (forged part) generated in the entire production process.

In accordance with a further advantageous variant of the invention, the further identifier is applied in a region of the workpiece that is exposed to low stresses during use of the workpiece. Preferably, the further identifier is applied in a region of the workpiece that is not subjected to any stresses during use of the workpiece. Thus, the further identifier of the workpiece has no negative influence on the properties of the workpiece. Due to the low or non-existent stress of the region with the further identifier, its legibility remains, which is also advantageous for later tracing.

However, for traceability, subsequent legibility of the further identifier is not mandatory, provided that the location where which workpieces were inserted/assembled with their further identifiers is documented.

In a further variant in accordance with the invention, in addition to the process parameters, quality data is at least partially captured in the process steps, which quality data is stored in the database together with the first identifier and/or the further identifier. The quality data is determined, for example, within the framework of an automatic and/or manual quality inspection and/or final inspection. Automatic determination is preferred, if it is possible. By determining and storing the quality data, the individual process steps or any subsequent further processing or assembly may refer back to the stored quality data. Thus, quality standards may be checked and guaranteed. Furthermore, it may not be necessary to perform one's own incoming inspection of workpieces.

According to a variant of the invention, the first identifier is generated in a region of the workpiece that does not undergo any forming by the forging process or that has already received its final shape by the forging process. In such region of the workpiece, the first identifier can theoretically be generated before or during the forging process, since the forging process has no (more) influence on such region and the first identifier thus remains readable.

In accordance with an expedient variant of the invention, the first identifier is generated by means of a needle printing method or embossing method.

In an advantageous variant, the embossing tools (for example, needles) are made of a hot-working steel, carbide or the like and/or have an active cooling unit. This extends the service life of the needle for the needle printing method or needle embossing method.

According to a further preferred variant in accordance with the invention, the device for generating the first identifier comprises a passive and/or active thermal protection device. A passive thermal protection device is, for example, a thermal insulator and an active thermal protection device is a cooling unit. This allows the negative heat influence of the forging process or the forged workpiece on the device for generating the first identifier to be reduced, thereby extending its service life and reducing failures.

In accordance with expedient variant of the invention, the further identifier is generated by means of a laser or by a printing method. A printing method generates the identifier on the surface of the workpiece and thus has no influence on the mechanical properties of the workpiece. However, a printed further identifier is usually less durable than further identifiers integrated into the surface. A laser generates the further identifier in the surface of the workpiece and thus can theoretically have an influence on the mechanical properties of the workpiece. However, the identifier is generated only in the top layer, such that the influence should be very small. The further identifier generated by means of a laser is usually more durable than a printed further identifier.

In one variant in accordance with the invention, the first identifier and/or the further identifier comprises a data matrix code, a QR code, a barcode, one or more numbers and/or digits, or other characters or symbols, in particular for indicating a part or drawing number, a supplier identifier, an order number, or the like.

According to a variant of the invention, the workpiece is provided with a plurality of first identifiers if the workpiece is divided in one of the subsequent production steps, wherein the plurality of first identifiers preferably are arranged such that each divided workpiece has a first identifier. If the division of the workpiece takes place at the end of the production process, the individual parts may each be provided with a further identifier by means of the surface inscription method and can each refer back to the process data and the first identifier together.

In accordance with a variant in accordance with the invention, the captured process parameters comprise target and actual values of plant automation systems of the forging process or the other process steps, machine data, process data, measurement logs, carbon emissions, or the like, preferably process temperatures, workpiece temperatures, in particular at different points in time, process times, cycle times, spray times, dwell times, process forces, forming and reaction forces, machine data, motor current consumption of main and auxiliary drives, deflection of the press body, unscheduled process events, die failure, in particular crack formation, forging of end pieces, double loaders, or the like. The carbon emissions as a process parameter comprise, in particular, the carbon emissions accrued in the respective process step.

In an advantageous variant in accordance with the invention, the process parameters are stored in the database together with the first identifier and/or the further identifier when predetermined limits or threshold values are exceeded and/or not reached. This means that all process parameters of all process steps of the production process are not necessarily stored; rather, only those process parameters which exceed predefined threshold values or limits are stored. This significantly reduces the amount of data that needs to be stored.

According to a particularly preferred variant, the method in accordance with the invention comprises analyzing the process data stored in the database to identify defective or faulty products, in particular on the basis of subsequently discovered defective or faulty products, and comparing the process data of the defective or faulty product with the process data in the database and identifying the corresponding product on the basis of the first identifier and/or the further identifier.

In accordance with an expedient variant of the invention, a process step with which the first identifier remains comprises sandblasting, shot peening, heat treatment such as case hardening, carbonitriding, quenching and tempering or the like of the workpiece.

In one embodiment of the invention, a process step with which the first identifier does not remain comprises the mechanical processing of the workpiece, such as turning, milling, grinding, or the like.

According to an expedient variant of the invention, the first identifier is generated by one or more marking units arranged directly in front of, in or behind the forging device. Due to the direct arrangement in front of, in or behind the forging device, the process parameters of the forging process may be clearly assigned to the first identifier applied immediately after or before or in parallel. There is no risk of confusion between the forging device and the marking unit. If this is not possible, unambiguous assignment must be ensured, for example by optical or logical tracing of the workpieces between the forging device and the marking unit. If the forging process is faster than the generation of the first identifier, a plurality of marking units are preferably assigned to a forging device, so that the generation of the first identifier does not reduce the throughput of the production process. In that case, the assignment of the workpieces to the individual marking units, together with the associated process parameters, must be ensured.

BRIEF DESCRIPTION OF THE DRAWINGS

The invention is explained in more detail below with reference to an exemplary embodiment shown in FIG. 1.

FIG. 1 shows a flow chart of an exemplary embodiment of a method for tracing forged parts over the entire production process, in particular from the forging process, via sandblasting and heat treatment, to mechanical processing.

DETAILED DESCRIPTION

FIG. 1 shows a flow chart of an exemplary embodiment of a method in accordance with the invention for tracing forged parts over the entire production process, in particular from the forging process, via sandblasting and heat treatment, to mechanical processing.

In accordance with the flow chart of the method in accordance with the invention in FIG. 1, the production process starts with a forging process. The process parameters of the forging process are captured in accordance with the invention.

After or during the forging process, the workpiece produced in the forging process is provided with a first identifier. The first identifier is generated by means of a mechanical or thermal penetrant method, in particular by means of a needle printing method or embossing method. The corresponding stamping means, such as needles, are made in particular of a hot-working steel, carbide or the like. Further, the embossing means or needles may comprise an active cooling unit. This allows the service life of the embossing medium or needles to be extended.

In order to better protect the device for generating the first identifier from the temperatures of the forging process and/or the workpiece, it preferably has a passive and/or active thermal protection device. This can be, for example, a thermal insulation unit or a cooling device.

In particular, the first identifier is generated in a region of the workpiece produced in the forging process, which is mechanically removed in one of the subsequent process steps. As a result, the first identification generated has no negative impact on the workpiece/product produced in the entire production process.

If the first identifier is generated during the forging process, this is done in a region of the workpiece that does not undergo any forming by the forging process or that has already received its final shape by the forging process. This ensures that the forging process does not affect the legibility of the first identifier.

If the forging process is faster than the generation of the first identifier, a plurality of devices may be provided to generate the first identifier, in order to not negatively influence the throughput of the production process by the generation of the first identifier. The at least one device for generating the first identifier is preferably arranged directly in front of, in or behind the forging device.

After the workpiece has been provided with the first identifier, the captured process parameters of the forging process are stored in a database together with the first identifier of the produced workpiece.

In the subsequent process steps, the identifier of the workpiece produced in the previous process step, for example the first identifier of the workpiece produced in the forging process, is read. Furthermore, the process parameters are captured in the subsequent process step.

In principle, a distinction is made in subsequent process steps as to whether or not, through the subsequent process step, the legibility of the identifier of the workpiece produced in the previous process step remains.

In the event that the legibility of the identifier of the workpiece produced in the previous process step remains, the sequence between reading the identifier of the workpiece and capturing the process parameters of the subsequent process step is not relevant and can be freely selected. In such a case, the captured process parameters of the subsequent (current) process step are captured and stored in the database for the read identifier. This is followed by the next process step.

Process steps with which the legibility of the first identifier remains comprise, in particular, sandblasting, shot peening, heat treatment such as case hardening, carbonitriding, quenching or tempering or the like of the workpiece.

In the event that the legibility of the identifier of the workpiece produced in the previous process step does not remain, the identifier of the workpiece produced in the previous process step is first read and subsequently the process parameters of the subsequent (current) process step are captured, since the legibility of the identifier of the workpiece produced in the previous process step is lost in the process. In such a case, the workpiece is marked with a further identifier by means of a surface inscription method.

The captured process parameters are subsequently stored with the further identifier in the database for the identifier of the workpiece produced in the previous process step, in particular the associated first identifier of the corresponding workpiece.

Thereby, the further identifier is applied in particular in a region of the workpiece that is exposed to low or no stresses during use of the workpiece.

The surface inscription method is based, for example, on laser marking or a printing method.

A process step with which the identifier of the workpiece produced in the previous process step does not remain comprises, in particular, mechanical processing of the workpiece, such as turning, milling, grinding, or the like.

Subsequently, another process step can follow or the production process is completed.

The captured process parameters of the forging process and/or the subsequent process steps comprise, for example, target and actual values from a plant automation system of the forging process or the subsequent process step, machine data, process data, measurement logs, carbon emissions, or the like. These preferably include process temperatures, workpiece temperatures, in particular at different points in time, process times, cycle times, spray times, dwell times, process forces, forming and reaction forces, machine data, motor current consumption of main and auxiliary drives, deflection of the press body, unscheduled process events, die failure, in particular cracking, forging of end pieces, double loaders, or the like. Conveniently, the carbon emissions accrued in a respective process step are captured as process parameters for the process step.

In addition to the process parameters, according to a variant in accordance with the invention, quality data may be at least partially captured in the process steps, which are stored in the database together with the first identifier and/or the further identifier.

The first identifier and/or the further identifier comprise, for example, a data matrix code, a QR code, a barcode, one or more numbers and/or digits, or other characters or symbols, in particular for indicating a part or drawing number, a supplier identifier, an order number, or the like. Since the first identifier is generated by a mechanical penetrant method, it preferably consists of a simple numeric or alphanumeric string or a dot matrix. In contrast, the further identification produced by means of a surface inscription method can have a more complex structure and contain additional information, for example in the form of a QR code.

According to a variant of the invention, the workpiece is provided with a plurality of first identifiers if the workpiece is divided in one of the subsequent production steps, wherein the plurality of first identifiers preferably are arranged such that each divided workpiece has a first identifier. If the division of the workpiece takes place at the end of the production process, the individual parts may each be provided with a further identifier by means of the surface inscription method and can each refer back to the process data and the first identifier together.

In an advantageous variant in accordance with the invention, the process parameters are stored in the database together with the first identifier and/or the further identifier when predetermined limits or threshold values are exceeded and/or not reached. This means that all process parameters of all process steps of the production process are not necessarily stored; rather, only those process parameters which exceed predefined threshold values or limits are stored. This significantly reduces the amount of data that needs to be stored.

In accordance with a particularly preferred variant, the method in accordance with the invention comprises analyzing the process data stored in the database to identify defective or faulty products, in particular on the basis of subsequently discovered defective or faulty products, and comparing the process data of the defective or faulty product with the process data in the database and identifying the corresponding product on the basis of the first identifier and/or the further identifier.

The invention claimed is:

1. A method for tracing forged parts over an entire production process, comprising:
capturing process parameters of a forging process;
marking a workpiece produced in the forging process with a first identifier by a mechanical or thermal penetrant method;
storing the captured process parameters of the forging process together with the first identifier of the workpiece in a database;
reading the first identifier from the workpiece;
capturing subsequent process parameters during a subsequent process step of the production process;
storing the subsequent process parameters of the subsequent process step in the database for the read first identifier in response to the first identifier of the workpiece remaining legible during the subsequent process step of the production process;
marking the workpiece with a further identifier by a surface inscription method in response to the first identifier of the workpiece not remaining legible during the subsequent process step of the production process; and
storing the subsequent process parameters of the subsequent process step together with the further identifier together with the captured process parameters and the first identifier in the database.

2. The method according to claim 1,
wherein the first identifier is generated in a region of the workpiece produced in the forging process which is removed in the subsequent process step.

3. The method according to claim 1,
wherein the further identifier is applied in a region of the workpiece that is exposed to low stresses during use of the workpiece.

4. The method according to claim 1,
wherein, in addition to the process parameters, quality data are captured and stored in the database together with the first identifier and/or the further identifier.

5. The method according to claim 1,
wherein the first identifier is generated in a region of the workpiece that does not undergo any forming by the forging process or that has already received a final shape by the forging process.

6. The method according to claim 1,
wherein the first identifier is generated by needle printing or needle embossing.

7. The method according to claim 6,
wherein needle printing or needle embossing is performed with needles that are made of a hot-working steel or carbide, or that have an active cooling unit.

8. The method according to claim 1,
wherein marking the workpiece with the first identifier is performed with a device for generating the first identifier that comprises a passive and/or active thermal protection device.

9. The method according to claim 1,
wherein the further identifier is generated by a laser or by a printing method.

10. The method according to claim 1,
wherein the first identifier and/or the further identifier comprises one or more of a data matrix code, a QR code, a barcode, numbers, digits, symbols for indicating a part or drawing number, a supplier identifier, or an order number.

11. The method according to claim 1,
wherein the workpiece is provided with a plurality of first identifiers if the workpiece is divided in one of the subsequent production steps, and
wherein the plurality of first identifiers are arranged such that each divided workpiece has one of the plurality of first identifiers.

12. The method according to claim 1,
wherein the captured process parameters comprises one or more of target and actual values of plant automation systems of the forging process or of the other process steps, machine data, process data, measurement logs, process temperatures, workpiece temperatures at different points in time, process times, cycle times, spray times, dwell times, process forces, forming and reaction forces, machine data, motor current consumption of main and auxiliary drives, deflection of a press body, unscheduled process events, die failure, forging of end pieces, and double loaders.

13. The method according to claim 1,
wherein the process parameters are stored in the database together with the first identifier and/or the further identifier when predetermined limits or threshold values are exceeded or not reached.

14. The method according to claim 1, further comprising analyzing the process data stored in the database to identify defective or faulty products based on subsequently discovered defective or faulty products, and
comparing the process data of the defective or faulty product with the process data in the database and identifying the corresponding product based on the first identifier and/or the further identifier.

15. The method according to claim 1,
wherein a process step with which the first identifier remains comprises one or more of sandblasting, shot peening, heat treatment, case hardening, carbonitriding, quenching and tempering of the workpiece.

16. The method according to claim 1,
wherein a process step with which the first identifier does not remain comprises a mechanical processing of the workpiece including one or more of turning, milling, and grinding.

17. The method according to claim 1,
wherein the first identifier is generated by one or more marking units arranged directly in front of, in, or behind a forging device.

* * * * *